Figure 1:
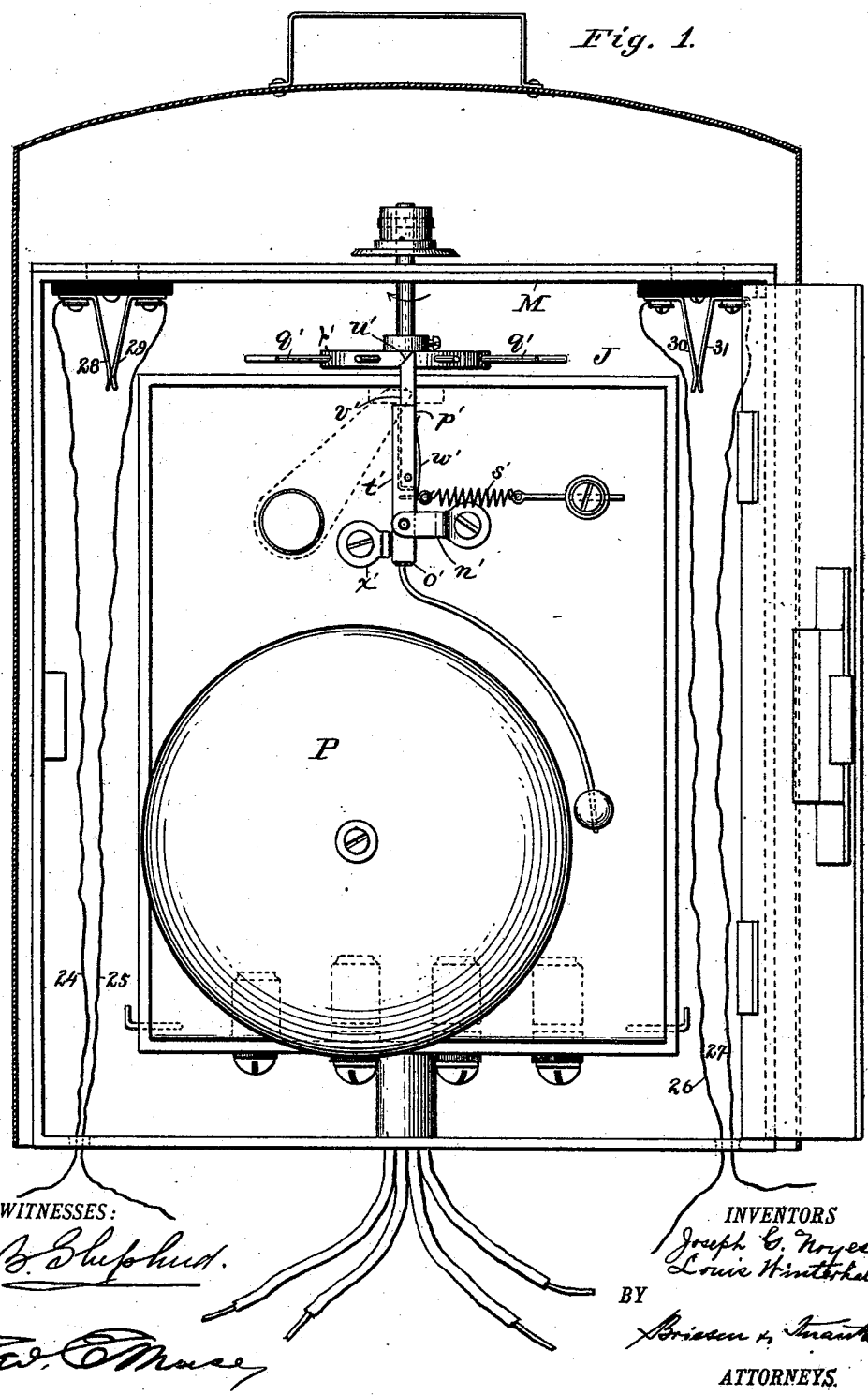

(No Model.) 10 Sheets—Sheet 1.

J. G. NOYES & L. WINTERHALDER.
SIGNALING SYSTEM.

No. 514,128. Patented Feb. 6, 1894.

WITNESSES:

INVENTORS
Joseph G. Noyes,
Louis Winterhalder
BY
ATTORNEYS.

(No Model.) 10 Sheets—Sheet 2.

J. G. NOYES & L. WINTERHALDER.
SIGNALING SYSTEM.

No. 514,128. Patented Feb. 6, 1894.

WITNESSES:

INVENTORS
Joseph G. Noyes
Louis Winterhalder
BY
Briesen & Smith
ATTORNEYS.

(No Model.) 10 Sheets—Sheet 3.
J. G. NOYES & L. WINTERHALDER.
SIGNALING SYSTEM.

No. 514,128. Patented Feb. 6, 1894.

WITNESSES:

INVENTORS

BY

ATTORNEYS.

(No Model.) 10 Sheets—Sheet 4.

J. G. NOYES & L. WINTERHALDER.
SIGNALING SYSTEM.

No. 514,128. Patented Feb. 6, 1894.

WITNESSES:

INVENTORS
Joseph G. Noyes
Louis Winterhalder
BY

ATTORNEYS.

(No Model.) 10 Sheets—Sheet 5.

J. G. NOYES & L. WINTERHALDER.
SIGNALING SYSTEM.

No. 514,128. Patented Feb. 6, 1894.

WITNESSES:

INVENTORS
Joseph G. Noyes
Louis Winterhalder
BY
Briesen & Knauth
ATTORNEYS.

THE NATIONAL LITHOGRAPHING COMPANY,
WASHINGTON, D. C.

(No Model.) 10 Sheets—Sheet 6.
J. G. NOYES & L. WINTERHALDER.
SIGNALING SYSTEM.
No. 514,128. Patented Feb. 6, 1894.
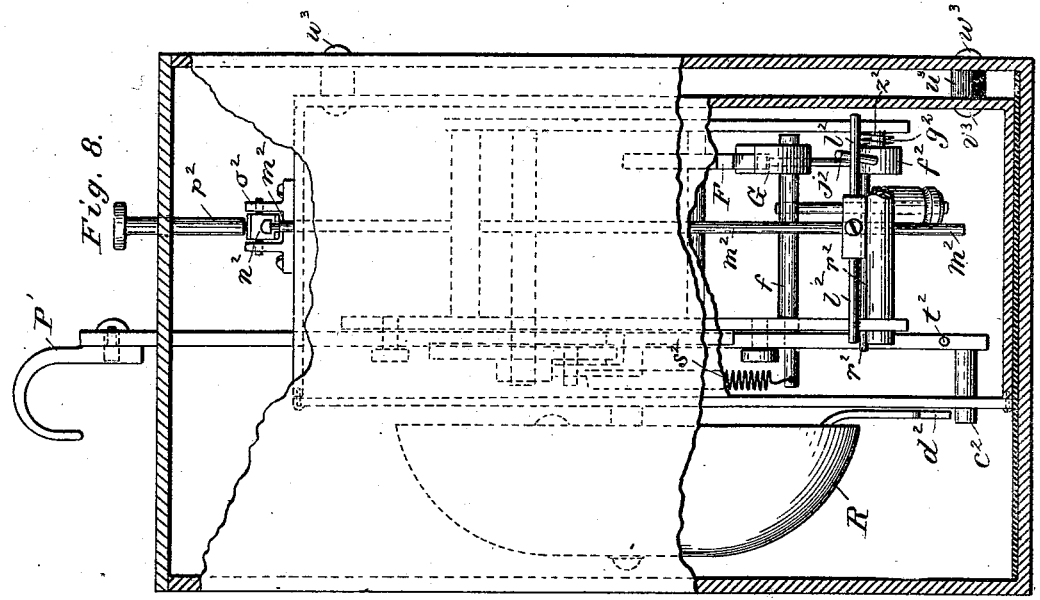
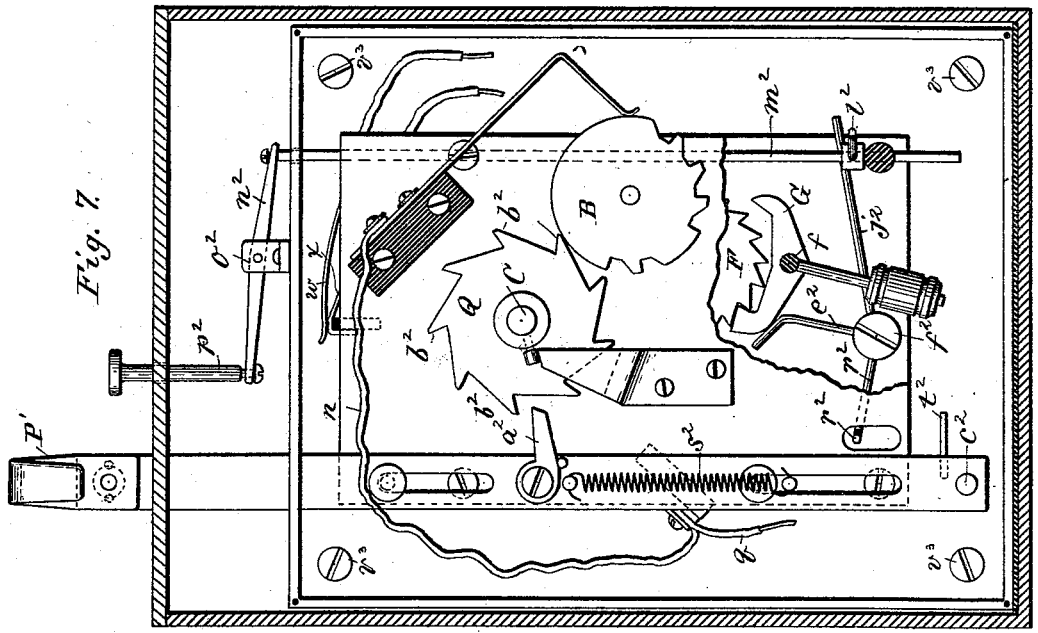
WITNESSES:
INVENTORS
Joseph G. Noyes
Louis Winterhalder
BY
Briesen & Knauth
ATTORNEYS.

(No Model.) 10 Sheets—Sheet 7.
J. G. NOYES & L. WINTERHALDER.
SIGNALING SYSTEM.
No. 514,128. Patented Feb. 6, 1894.
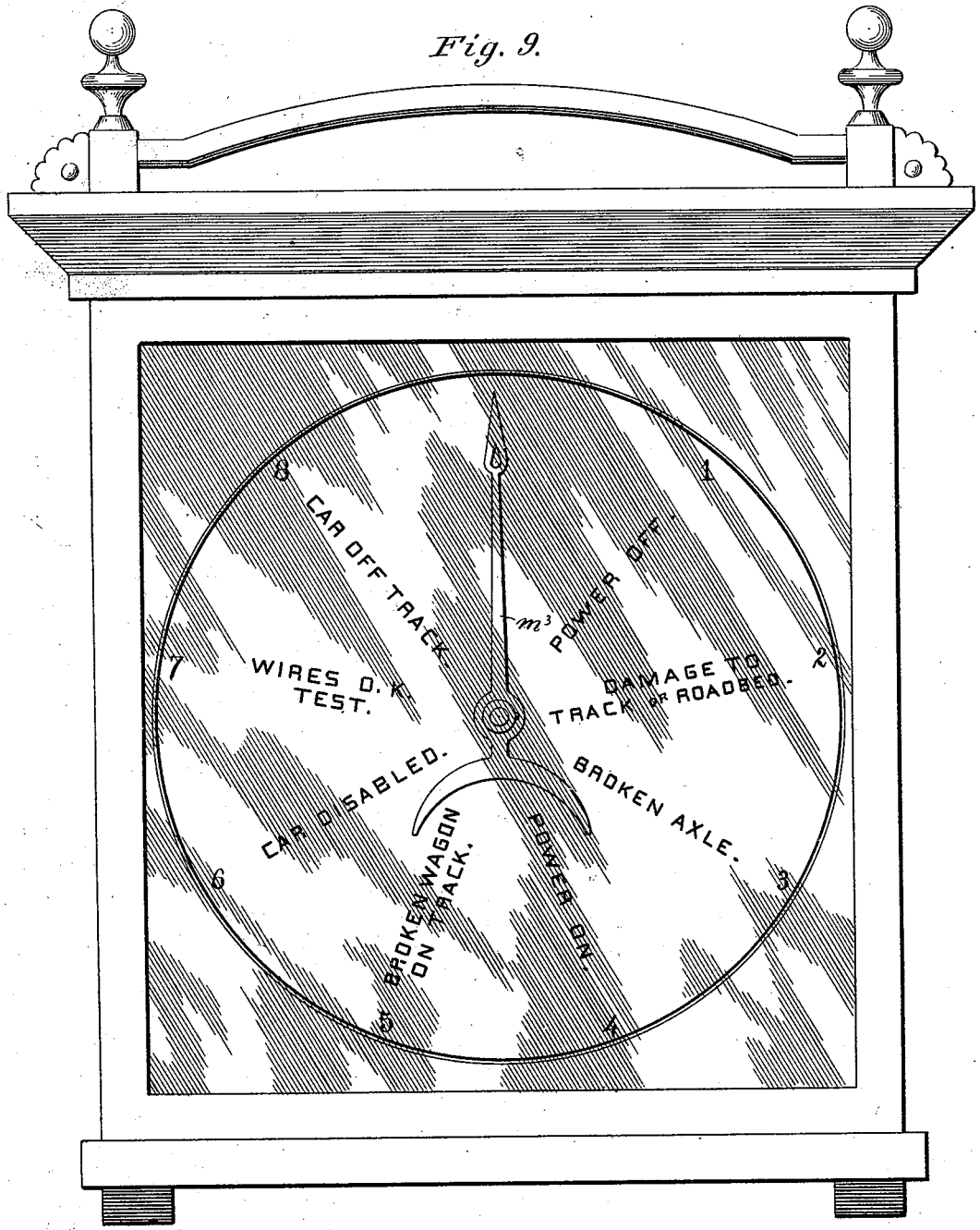
WITNESSES:
INVENTORS
Joseph G. Noyes
Louis Winterhalder
BY
Briesen & Knauth
ATTORNEYS.

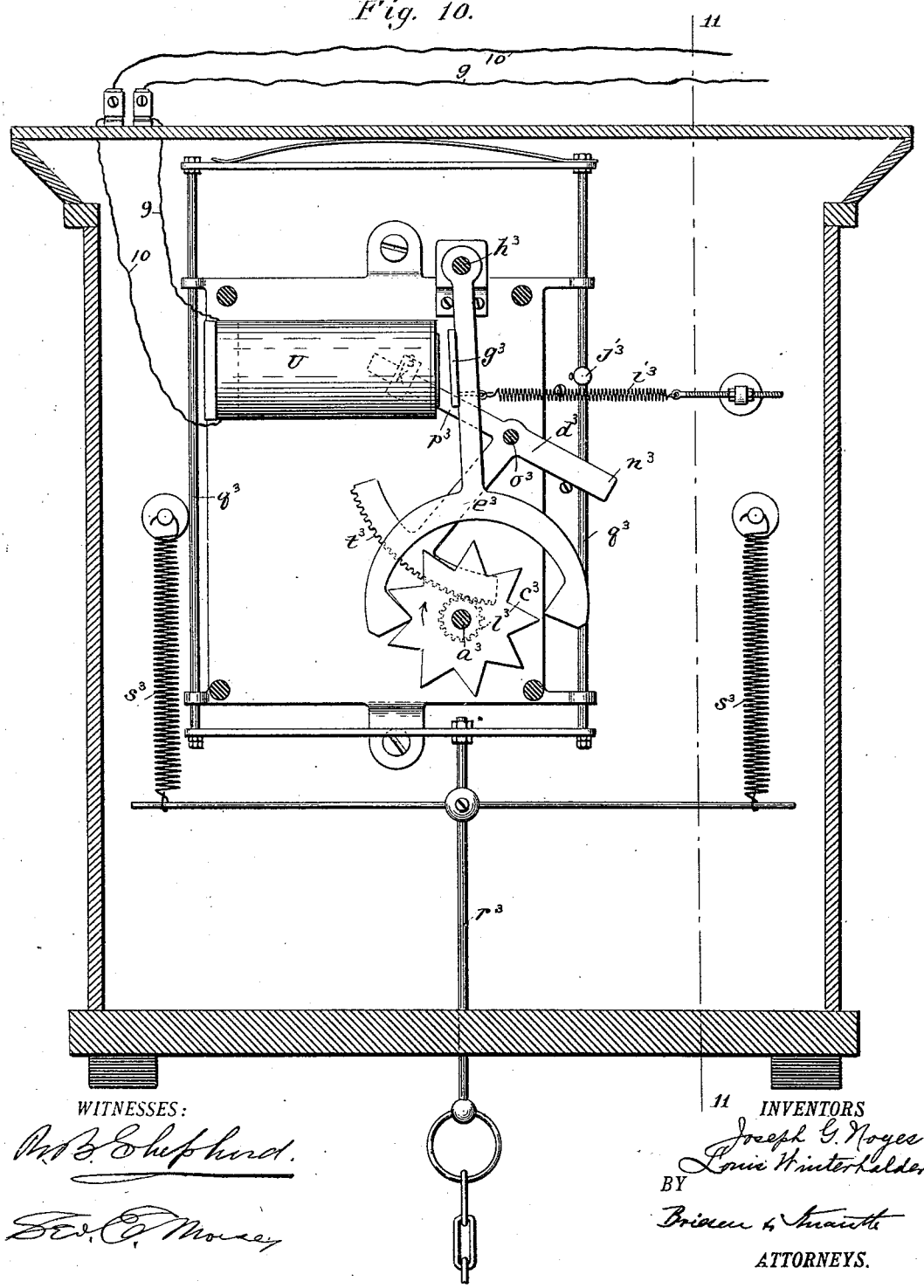

(No Model.) 10 Sheets—Sheet 9.

J. G. NOYES & L. WINTERHALDER.
SIGNALING SYSTEM.

No. 514,128. Patented Feb. 6, 1894.

WITNESSES:

INVENTORS
Joseph G. Noyes
Louis Winterhalder
BY
ATTORNEYS.

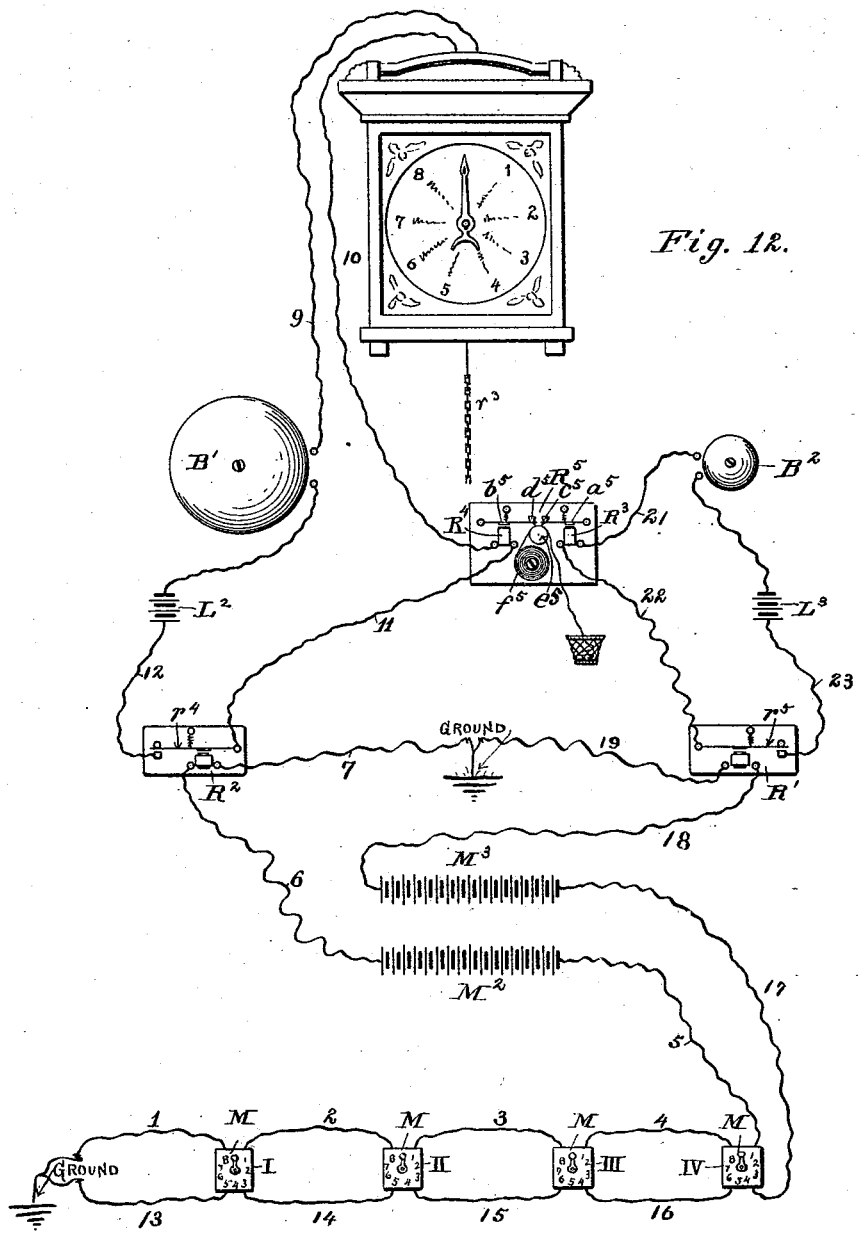

UNITED STATES PATENT OFFICE.

JOSEPH G. NOYES AND LOUIS WINTERHALDER, OF MILFORD, CONNECTICUT.

SIGNALING SYSTEM.

SPECIFICATION forming part of Letters Patent No. 514,128, dated February 6, 1894.

Application filed July 3, 1893. Serial No. 479,455. (No model.)

*To all whom it may concern:*

Be it known that we, JOSEPH G. NOYES and LOUIS WINTERHALDER, residents of Milford, New Haven county, State of Connecticut, have invented certain new and useful Improvements in Signaling Systems and Apparatus, of which the following is a specification.

Our invention relates to signaling systems and apparatus for use therein, and has for its object to provide a mechanism for signaling the "want" and the locality from a single box, over separate circuits, and means for properly receiving and registering such signals at a central station.

Our invention consists in the general system and the various combinations in the box and other parts of the system as described herein, illustrated in the accompanying drawings forming part hereof and specifically pointed out in the claims.

Our invention may be used in any situation where it is desirable to signal from several sub-stations to a central station "wants," as they are technically called, and the locality of the station from which the want signal is sent. We have shown it as applied to the necessities of a street railway system, but it will be obvious that it may be used in various other situations, such as hotels, fire-alarm systems, and analogous uses.

Figure 2:
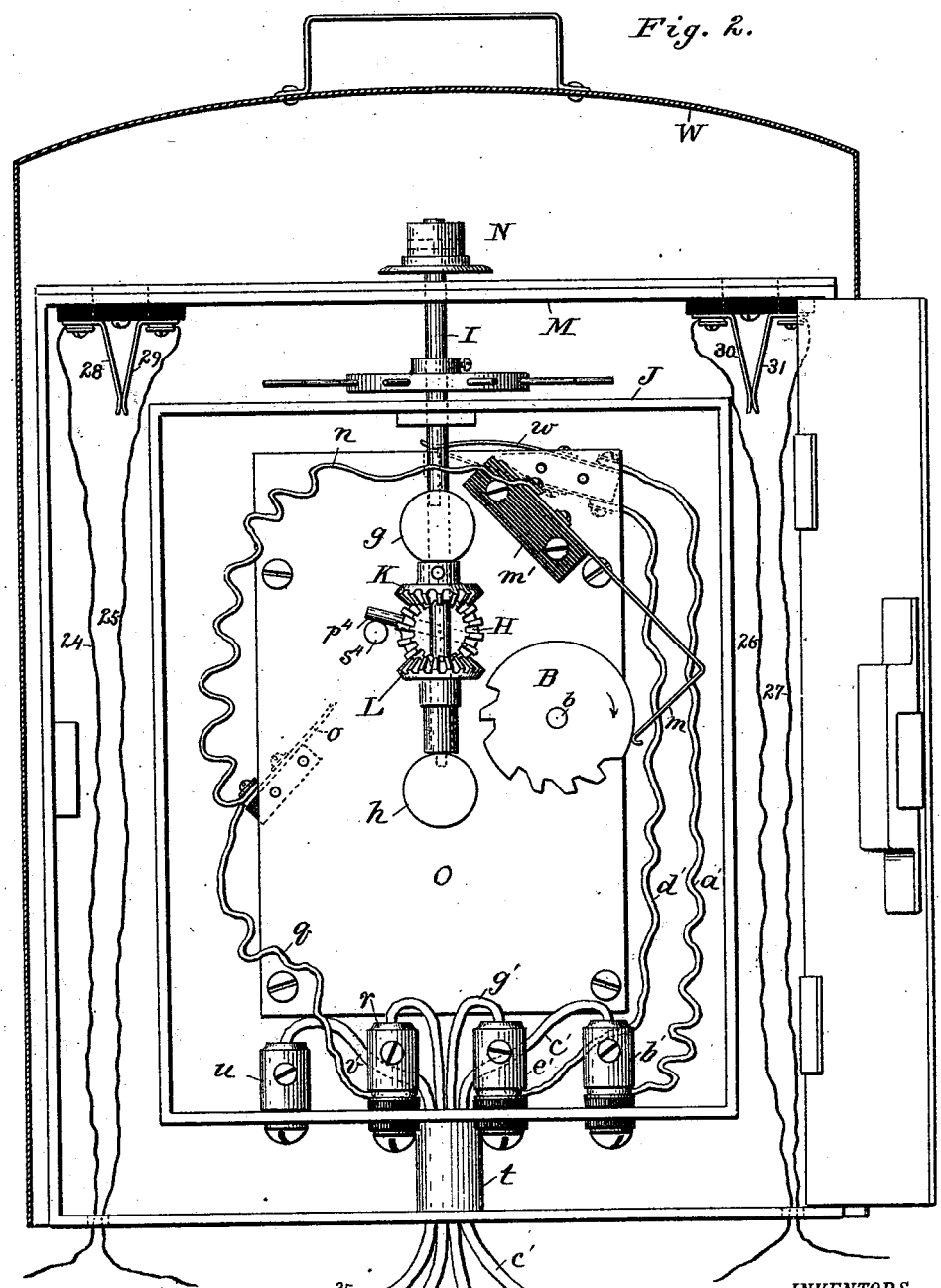
Figure 3:
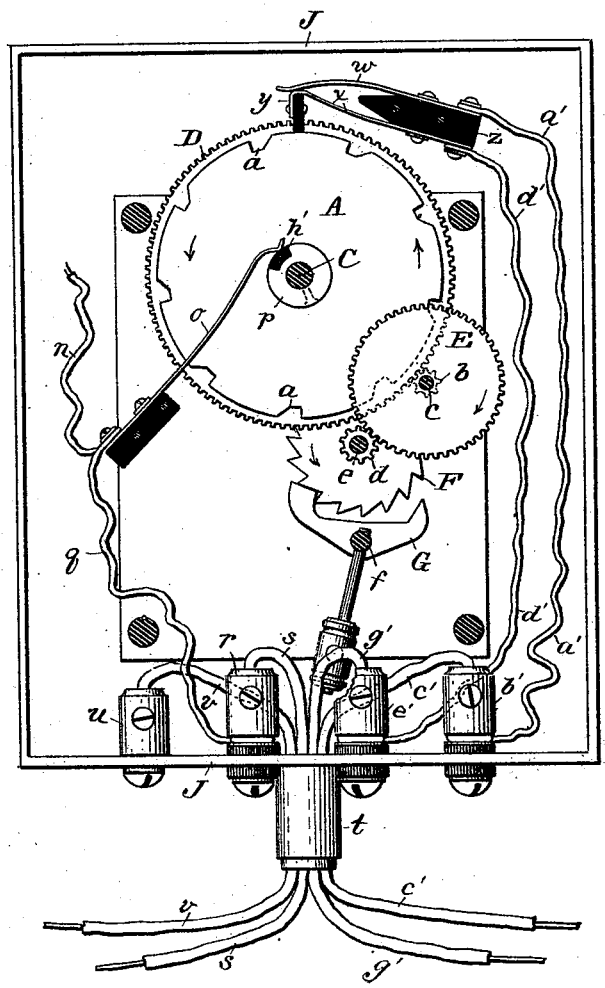
Figure 4:
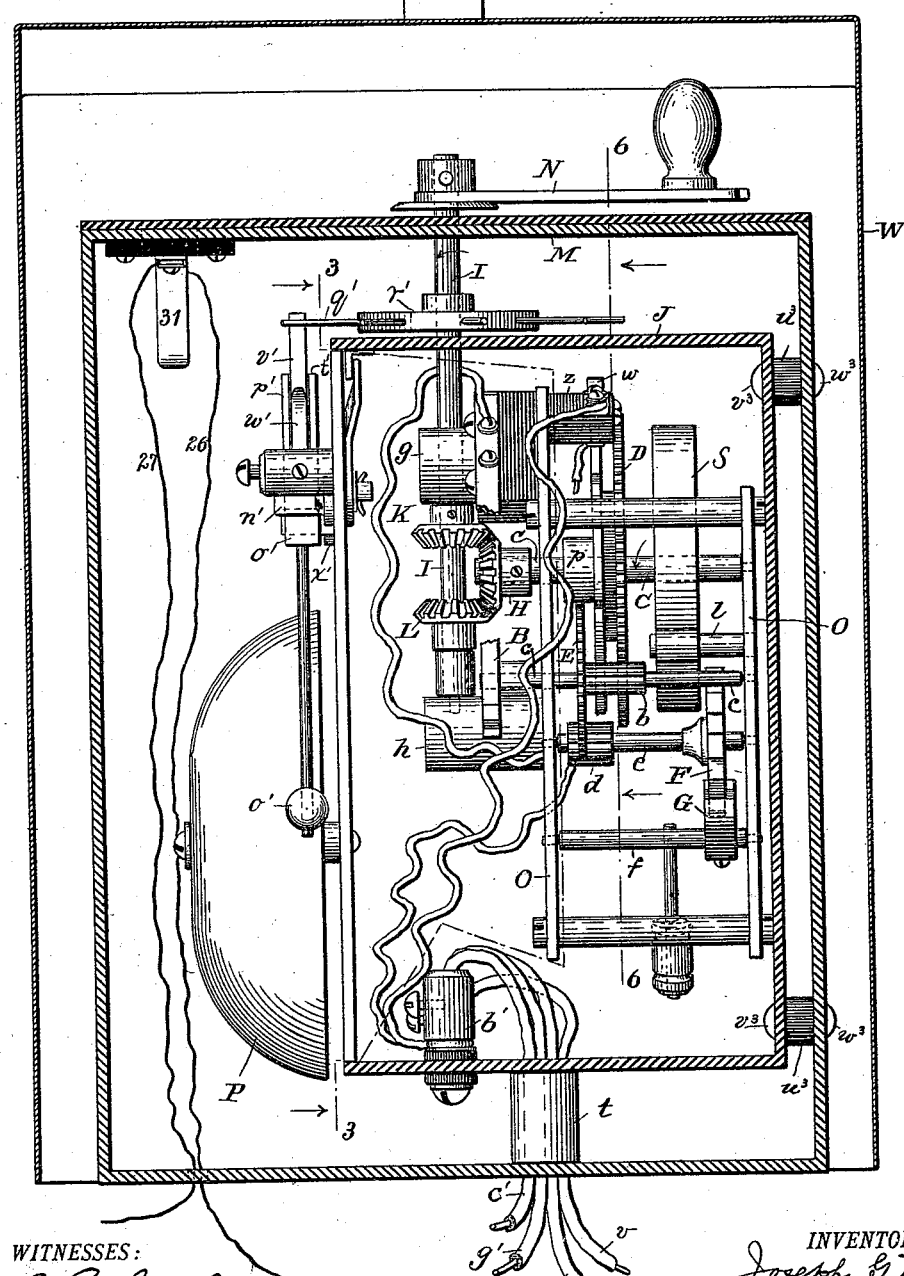
Figure 5:
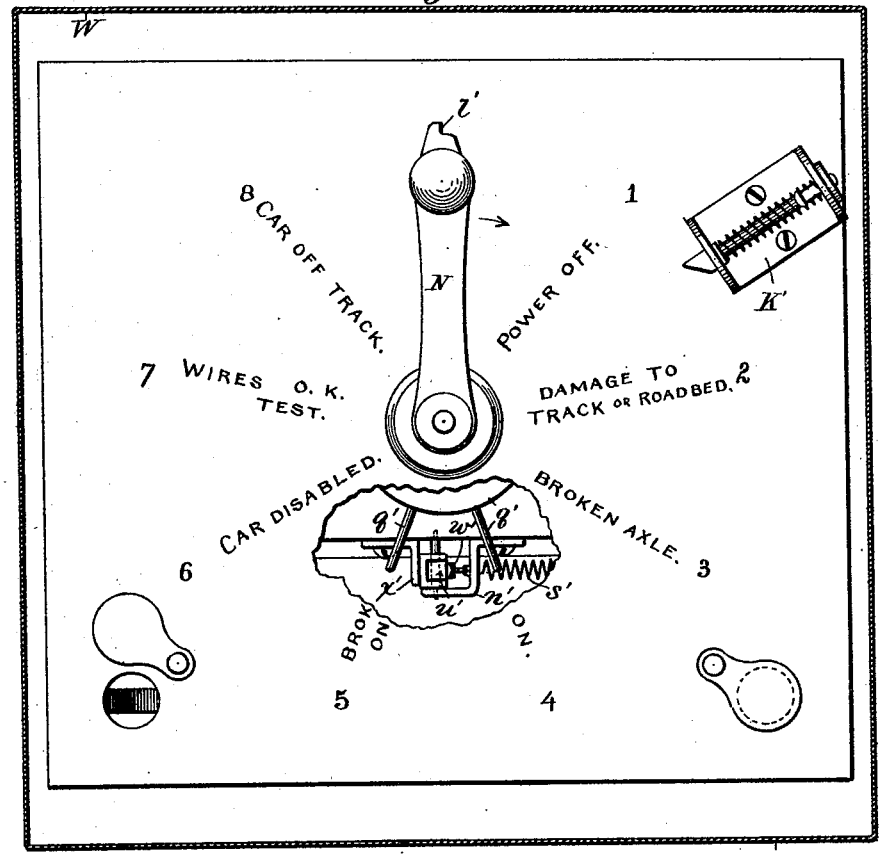
Figure 6:
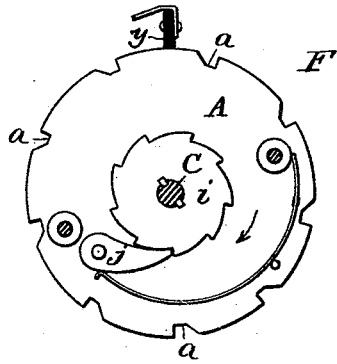
Figure 11:
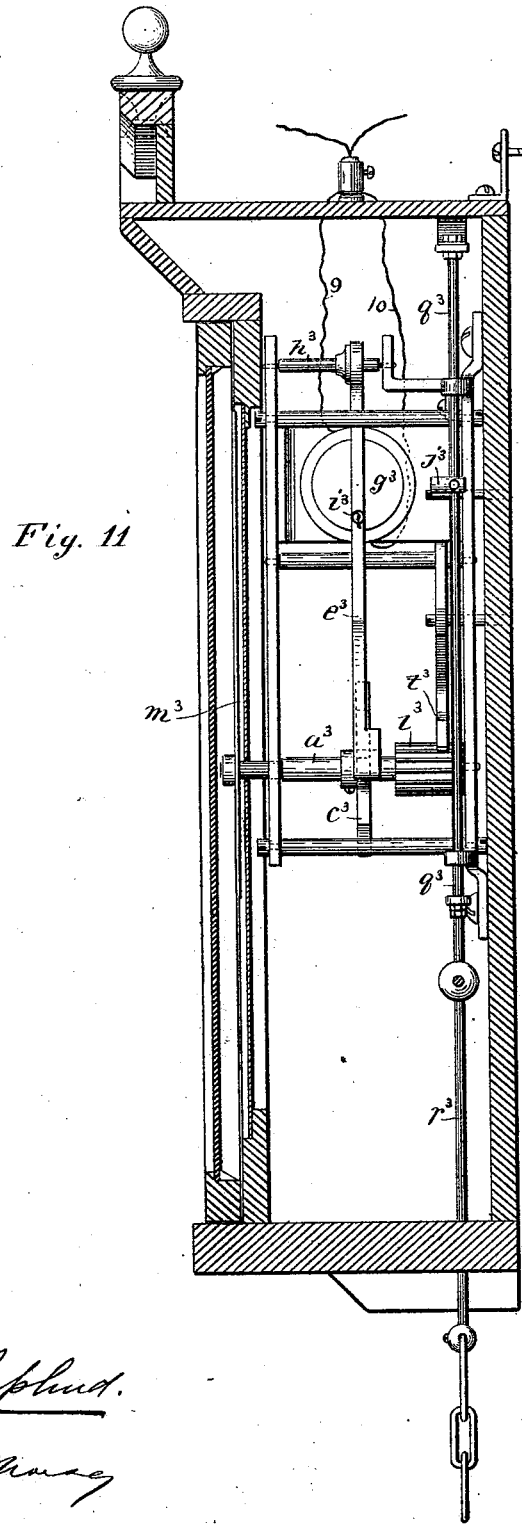

In the accompanying drawings, forming part hereof, Figure 1 is a face view of the transmitting box, showing the cover in transverse section, and the door of the outer box open. Fig. 2 is a similar view with the front plate of the inner box removed. Fig. 3 is a transverse section on line 3—3 of Fig. 4. Fig. 4 is a side view of the box mechanism with a side of the cover, and of both boxes removed, and partly in vertical section. Fig. 5 is a top view, partly broken away, of the box with the top of the cover removed and the sides thereof in horizontal section. Fig. 6 is a detail view of one break-wheel and connected mechanism. Fig. 7 is a front view of a modification hereinafter described being our preferred form of setting mechanism for the signal box, with the front plate of the box removed. Fig. 8 is a side view thereof with a portion of the side of the box broken away to show the internal mechanism. Fig. 9 is a front view of the visual indicator at a central station. Fig. 10 is a front view of the same with the face removed, showing the operating parts. Fig. 11 is a section of the visual indicator on line 11—11 of Fig. 10. Fig. 12 is a diagram of the circuits of the system.

Referring to Figs. 2 and 3 it will be seen that there are within the box J two break-wheels A and B which are connected in separate circuits, as will be hereinafter more fully described. The break-wheel A, having notches $a$, is loosely hung upon the arbor C and is bolted to the spur-wheel D, loosely hung upon the same arbor. Between the break-wheel A and the spur-wheel D, is a ratchet $i$ rigidly mounted upon the arbor C. (See Fig. 6.) A spring-pressed pawl $j$ hung on a pivot attached to the wheels A and D, and between them, serves to engage the ratchet $i$ to cause the wheels to follow the motion of the arbor when it rotates in the direction of the arrow. The pin $p^4$ on the arbor C, and the stop $s^4$ on the front plate of the frame O limit the movement of the arbor. When the arbor moves in the opposite direction to wind the spring and set the signal box, the pawl $j$ will not engage the ratchet, and the joined wheels A and D will remain at rest, and consequently the train of wheels will remain at rest. The wheel D meshes with the pinion $b$, on the arbor $c$, which also carries the break-wheel B and wheel E. The wheel E meshes with the pinion $d$ on the arbor $e$ which also carries the ratchet F. Normally the ratchet is locked from movement by a gravity escapement G pivoted by the arbor $f$.

It will be seen that when motion is communicated to the wheel D through the arbor C, the train of wheels will rotate, and consequently also rotate the break-wheel B. Upon one end of the arbor C is mounted a bevel pinion H, which meshes with a bevel pinion K, and idler L, both on the shaft I, which is stepped in the boss $h$, passes loosely through the boss $g$ and through the sides of both boxes J and M. Secured to the end of the shaft I is an operating handle N. The handle, shaft and bevel-gear, serve to set the box for sending in the signal in a manner to be described. The spiral spring S is coiled around and attached at its inner end to the arbor C. The other end thereof is attached to a stud $l$ on the frame O containing the mechanism. A contact spring $m$ bears upon the break-wheel B, and is attached to an insulating block $m'$ mounted on the front plate of the frame O. The spring $m$ is electrically connected by an insulated wire $n$ to a contact spring $o$, which bears upon the hub $p$ fast on the arbor C. An insulated wire $q$ in turn electrically connects the contact spring $o$ with the binding post $r$ insulated from its containing box J. An insulated wire $s$ leads from the binding post $r$ through the hole and sleeve $t$ in the side of the box, and thence to ground or down line. Upon the hub $p$ is an insulating section $h'$ upon which the spring $o$ normally bears when the box is not in use. As soon as the arbor C begins to rotate, as in sending in a signal, the insulating section $h'$ moves from under the spring $o$, whereupon the said spring will bear upon the conducting portion of the hub and will short circuit the break-wheel B through spring $o$, frame O, and sides of the box J to binding post $u$ as will be readily seen.

The circuit through the break wheel B is normally completed through the arbor $b$, frame O, box J, to the binding post $u$, insulated wire $v$, passing through sleeve $t$, outside of the box, thence to central station. The break-wheel A sends its signals through a separate circuit by means of the separation of circuit springs $w$, $x$, normally in contact and in the signaling circuit. Attached to the spring $x$ is a block $y$ of insulating material, which bears upon the break-wheel A, and whenever the block drops into a notch $a$ in the break-wheel, the circuit springs $w$, $x$, are separated, and the circuit is broken, and a signal is sent. The springs $w$ and $x$ are mounted on a block $z$ of insulating material, attached to the front plate of the frame O of the mechanism in the manner shown. The spring $w$ is electrically connected by the insulated wire $a'$ to the binding post $b'$, insulated from the box J. Insulated wire $c'$ is electrically connected to the binding post $b'$ and passes out of the box through the sleeve $t$, thence to ground or down line. To the spring $x$ is electrically connected an insulated wire $d'$, which is electrically connected to a binding post $e'$, to which is electrically connected an insulated wire $g'$, which passes out of the box through the sleeve $t$. This wire $g'$ runs up-line to central station. The circuits throughout are normally closed. The box J containing the signaling mechanism is insulated from the ground in any suitable manner such as by the sleeve $t$ and the blocks $u^3$ which receive short screws $v^3$, $w^3$ to support the box J inside the box M.

The cover W is for the purpose of protecting the box from dust and moisture when in exposed situations.

In Fig. 5 we have shown the setting mechanism consisting of the handle N and pointer $l'$, and a dial containing a number of calls or "wants" to which the pointer may be turned, and as it is usual to put the call most frequently used first in the path of the pointer, we place a spring catch K' in the path of the arm and pointer to stop the arm in order that it may not be carried too far before being released to send in the first call. When it is desired to send in any other call the spring catch may be moved out of the path of the arm to allow the pointer to be set on the desired call. As the signal boxes are often placed in positions where there is not sufficient light to plainly see the dial, we have arranged in the box means to tap a bell as the pointer passes each call to give an audible signal of such event, so that the operator will know at all times the position of the pointer. Mounted in the signal box is a bell P; the hammer $o'$ therefor is pivoted in brackets $n'$ and has an extension $p'$ which is in the path of the radial arms $q'$ on the hub $r'$ mounted on the shaft I. A retracting spring $s'$ restores the parts to their normal positions and causes the hammer to tap the bell. The extension $p'$ of the hammer we prefer to make in two pivoted parts, as $t'$ and $v'$, and support them by a restoring spring, $w'$. The end of $v'$ is beveled as at $u'$ and a stop $x'$ bears upon the hammer. It will be seen that motion of the shaft in the direction of the arrow will cause the arms $q'$ to engage the extension of the hammer and move it aside and when the arm has moved far enough to release the hammer the retracting spring will cause it to fly back and tap the bell. Upon motion of the shaft in the reverse direction the arms will engage the hammer as before, but will merely swing the pivoted section $p'$ which will be restored to place by the spring $w'$. The hub is so fixed on the shaft that as the pointer passes each call or "want" on the dial in setting the box, an arm $q'$ will contact with the hammer and tap the bell. It will thus be seen that, by counting the strokes, the operator can be at all times certain of the position of the pointer on the dial.

In Figs. 7 and 8 we have shown a modification, which is in all respects similar to the dial box described with such changes in the means for tapping the indicating bell and such a releasing mechanism for the box as may be necessary in this modified construction. The pull P', having a suitable restoring means, such as a spring $s^2$, has thereon a pawl $a^2$ to engage a tooth $b^2$, of a ratchet Q on the shaft C, which winds the spring for rotating the break-wheels, and revolve it the space of one tooth. A stud $c^2$ on the pull contacts with an arm $d^2$ to strike the bell R at each upward movement of the pull. Upon one face of the box are affixed the names and numbers of the wants or calls, and to send in any desired call it is merely necessary to operate the pull the designated number of times. The pull rings the bell each time it is operated and gives notice that the ratchet has been rotated the space of one tooth. As the ratchet is stepped around by the pull the box is held from sending in its signal by the pallet G held in engagement with the ratchet F by means of the arm $e^2$ on the hub $f^2$ mounted on the arbor $g^2$ and having a friction device between the hub and the back-plate of the frame, such as a spiral spring $z^2$ or a spring washer, to hold the hub by its friction in any position into which it may be rotated. From the hub $f^2$ extends an arm $j^2$ which rests upon a cross-bar $l^2$ on the rod $m^2$ which is suspended from one end of a lever $n^2$ pivoted in a stirrup $o^2$ and connected at its other end to a plunger $p^2$. It will be seen that when the ratchet has been stepped around to the required position and the spring has been sufficiently wound, pressure upon the plunger $p^2$ will by means of $n^2$, $m^2$ and $l^2$ lift the arm $e^2$ from engagement with the pallet and release the mechanism, which will then operate to send in the signal. While the signal is being sent in the pallet will rattle on the ratchet F, but will not interrupt its rotation. When the pressure on the plunger $p^2$ has been released the rod $m^2$ will drop by gravity and restore the plunger to its initial position. The arms $e^2$ and $j^2$ are restored to position at the beginning of the next call by the pin $t^2$ on the pull coming in contact with the bent end of the arm $r^2$ on the hub $f^2$ and lifting the arm $r^2$ to rotate the hub. The breakwheels A and B are in separate circuits and send in separate signals; wheel A serves as the wheel to send in the "want" or special call, and the wheel B the number and consequently the locality of the box.

We will designate the wheel A as the "want wheel" and the wheel B as the "locality wheel." These wheels are in separate circuits throughout the system and the respective signals sent in are separately received and recorded. As the signals from the "want" wheel consist each of a definite number of impulses for each want, we prefer to use as a receiver therefor a step by step visual signal with an audible signal connected thereto; but it is obvious that we may use any suitable receiving apparatus. Figs. 9, 10 and 11 represent such a step by step mechanism having a dial upon which are marked the calls and numbers corresponding to those on the dial of the signal box. Upon a suitably supported arbor $a^3$ is mounted the hand or pointer $m^3$ which traverses the dial. Motion is communicated to the arbor and hand in the direction of the arrow by means of the ratchet $c^3$ actuated by the pawl $e^3$ pivoted at $h^3$ and engaging the ratchet. An armature $g^3$ for magnet U is mounted on the pawl and a restoring spring $i^3$ serves to return the pawl to its initial position. Makes and breaks in the circuit 9—10 of the magnet U will serve to vibrate the pawl in the usual manner and step the ratchet around one step for each make and break. To restore the hand to the zero point on the dial we have provided a three-armed lever $d^3$ pivoted at $o^3$. An arm $n^3$ of the three-armed lever extends into the path of a stud $j^3$ on a frame $q^3$ operated by a pull $r^3$ and restored by springs $s^3$. Another arm $p^3$ carries a counter-balancing weight $k^3$. The third arm has thereon a toothed arc $t^3$ which meshes with a pinion $l^3$ on the arbor $a^3$. It will be seen that movement of the arbor and hand, in response to a signal will by means of the pinion $l^3$ and arc $t^3$, rock the three-armed lever and raise the arm $n^3$. When the hand has come to rest and it is desired to restore the parts to their normal position, the frame $q^3$ is operated by means of the pull $r^3$ and the stud $j^3$ comes in contact with the arm $n^3$ and rocks the three-armed lever, which as it is restored to its initial position rotates the arbor $a^3$ by means of the arc and pinion and restores the pointer to zero on the dial.

In Fig. 12 we have shown the exterior circuits and apparatus at central station. We have shown several of our boxes M each at station I, II, III, IV, connected in series, but it is obvious that we may use two separate circuits for each box leading to central, as for instance, when the boxes are grouped around the central station instead of being located along a line. The circuit of the want wheels of the several boxes is completed from ground by wire 1 to the box M at station I, through the circuit of the want wheel in the box, thence, by wire 2 to the box at station II, through the circuit of the want wheel at this station, thence by wire 3 to station III, through the circuit of the want wheel at this station, thence by wire 4 to station IV, through the circuit of the want wheel at this station, thence by wire 5, main battery $M^2$, wire 6, relay $R^2$ at central and by wire 7 to ground. The local circuit of the relay $R^2$ is completed by the armature $r^4$ through wire 12, local battery $L^2$, gong B' (also at central), wire 9, magnet U of the indicator, wire 10, magnet $R^4$ of a double register at central, wire 11, back to the armature of relay $R^2$.

The circuit for the locality signal is completed as follows: from ground by wire 13 to box M at station I, through the locality wheel and its circuit in the box, thence by wire 14 to station II and through the locality wheel circuit as before, thence by wire 15, to station III, through the locality wheel circuit as before, by wire 16 to station IV, through the locality wheel circuit, thence by wire 17, main battery $M^3$, wire 18, relay R' by wire 19 to ground. The local circuit of relay R' is completed by the armature $r^5$ through wire 23, local battery $L^3$, bell $B^2$, wire 21, magnet $R^3$ of a double register $R^5$, wire 22 back to the armature $r^5$. The double register $R^5$ consists of two relays $R^3$ and $R^4$ in separate local circuits as described. Upon the armature $a^5$, $b^5$ of these relays are marking points $c^5$, $d^5$ which bear upon a roll $e$ over which passes a tape $f^5$. The points bear upon the tape on different sides of the center line, so that the marking of the points will not be confused.

The operation is as follows: Suppose it is desired to send in from any box the sixth call, which in this case indicates that a car is disabled; the handle N is turned in the direction of the arrow to the sixth call, the bell in the box ringing six times, or else the pull in the modification in Figs. 7 and 8 is pulled up six times, the bell ringing as before described. This serves in each instance to turn the arbor C, carrying with it the hub $p$, to wind the spring S so far that upon its release it will engage the pawl and ratchet $j$, $i$, (see Fig. 6) and cause the want wheel A to revolve until six notches have passed under the block $y$. It will be observed that in the normal position (see Fig. 3) the contact spring $o$ bears upon the insulating piece $h$ of the hub $p$ as before pointed out. When the box is released the want wheel will begin to revolve in the direction of the arrow (Fig. 3) and by means of the spur gear described rotate the locality wheel. The locality wheel makes one complete revolution while the want wheel is revolving the distance from one notch $a$ to another. By the turning of the arbor C the insulating piece on the hub $p$ will pass from under the contact spring and the locality wheel will be short-circuited through the frame O, box J and binding post $u$, and will send in no signal as long as the spring $o$ bears upon the metallic part of the hub $p$. As the want wheel continues to revolve, the block $y$ will fall into a notch $a$ in the wheel and will separate the springs $w$ and $x$ and break the circuit. This will cause the armature $r^4$ to fall away from the relay $R^2$, break the local circuit and ring the gong $B'$, and step the visual indicator and pointer one step to the first call. As the want wheel rotates the block $y$ will rise upon the inclined side of the notch $a$ and again bear on the edge of the wheel. This re-establishes the circuit and draws up the armature $r^4$ to the relay $R^5$. As each successive notch passes under the block this operation will be repeated, and the indicator stepped around to the sixth call and the gong $B'$ rung a corresponding number of times. The relay $R^4$ of the double register will cause the point $d^5$ to register the want on one edge of the tape, the last signal being sent as the handle N and pointer $l'$ are passing the first call on the dial in their return movement. As soon as this last signal is sent in by the want wheel, the insulation will come under the contact spring $o$ and the locality wheel will be cut in, and as the pointer $l$ is moving from the first call to zero on the dial, the locality wheel will send in its signal (giving the box number) which will come in to central over wire 18. This will vibrate the armature of the relay $R'$ and operate the relay $R^3$ of the double register and ring the bell $B^2$ in the same manner as is done on the want side of the circuits. As before explained the want calls and the box number are recorded on opposite sides of the center line of the tape. This facilitates reading and avoids confusion. The bells $B'$ and $B^2$ are of different tones for a similar purpose. The attendant at central has thus several means of determining the want and locality and at the same time the signal is recorded by the double register. It will be seen that we have designated one call as "test." This is for the purpose of testing out the line. We have also shown additional wires 24, 25, 26 and 27 electrically connected to spring jack switches consisting of pairs of leaf springs 28 and 29, 30 and 31 in contact. These wires lead to central and have suitable connections and receiving instruments. When it is desired to communicate to central other information than is provided for on the dial, the pointer $l'$ is turned to test and released, and the test call is sent in. This notifies the attendant that some further call is to be sent in. Then the plug of a "pocket-call" or of a portable telephone set is inserted in its appropriate hole and spring jack and the desired signal sent in over the additional wires, and by means of a strap key in central a return signal or tap is sent over same wires, thus actuating the magnets to give an answer back call in the box.

We do not limit ourselves to the precise devices, construction or arrangement described herein, as it is obvious that these may be greatly varied without departing from the spirit of our invention; but

What we claim, and desire to secure by Letters Patent, is—

1. In a signaling system, the combination of the following instrumentalities, viz: a central station, a series of signal boxes, each box having a want signaling mechanism and a locality signaling mechanism, a circuit to the central station in which all the want signaling mechanism of the system are included, a circuit to the central station in which all the locality signaling mechanism of the system are included, and a separate receiving instrument in each circuit at the central station, substantially as described.

2. In a signaling system, the combination of the following instrumentalities, viz.: a central station, a series of signal boxes, each box having a want signaling mechanism and a locality wheel, a circuit to the central station in which all the want signaling mechanism of the system are included, a circuit to the central station in which all the locality signaling mechanism of the system are included, a cut out in each box actuated by the movement of the want signaling mechanism to cut out the locality signaling mechanism until the want signaling mechanism has sent in its signal, and a separate receiving instrument in each circuit at the central station, substantially as described.

3. In a signaling system, a signal box having a want wheel and a locality wheel each manipulating a separate circuit to a central station, a double register at the central station having one relay actuated by each circuit, and marking points actuated by each relay bearing on opposite sides of the center line of a tape, whereby the signals from each wheel are separately received and recorded, substantially as described.

4. In a signal box, the combination of a want wheel and a locality wheel each manipulating separate circuits to a central station, a device for simultaneously propelling the wheels, and means substantially as described for cutting out the locality wheel until the want wheel has sent in its signal, substantially as described.

5. In a signal box, the combination of a want wheel and a locality wheel each manipulating a separate circuit to a central station, and a cut out device controlled by the movement of the want wheel operating to cut out the locality wheel until the want wheel has sent in its signal, substantially as described.

6. In a signal box the combination of a want wheel and a locality wheel each manipulating a separate circuit to a central station, a device for simultaneously propelling the wheels, and means controlled by the movement of the want wheel for cutting out the locality wheel until the want wheel has sent in its signal, substantially as described.

7. In a signal box, the combination of simultaneously propelled signal wheels manipulating separate circuits, one wheel being electrically connected to a hub upon the arbor of the other wheel, an insulating segment upon the hub, a contact spring included in a short circuit around the first mentioned wheel bearing upon the hub and resting upon the insulating segment when the wheels are at rest, whereby upon movement of the wheels the insulation will pass from under contact spring and the first mentioned wheel will be short circuited until the other wheel has completed its revolution, and the contact spring again bears upon the insulation, substantially as described.

8. In a signal box the combination of circuit wheels A and B manipulating separate circuits, the circuit of wheel B being normally completed through the frame O of the box J, a hub $p$ on the arbor of the wheel A in electrical connection with the box, and having an insulating segment upon which the contact spring $o$ normally rests, whereby upon revolution of the arbor the wheel B will be short circuited until the contact spring bears upon the insulation, substantially as described.

9. In a step-by-step device the combination of a magnet, an armature therefor, a pawl and ratchet actuated by the magnet to move a hand step by step, and mechanism for restoring the hand to its initial position consisting of a pinion on the arbor of the ratchet, a pivoted lever carrying a toothed arc meshing with the pinion, and having an arm extending into the path of a movable stud, to rock the lever and restore the hand, substantially as described.

10. In a step-by-step device the combination of a magnet, an armature therefor, a pawl and ratchet actuated by the magnet to move a hand step by step, and mechanism for restoring the hand to its initial position consisting of a pinion on the arbor of the ratchet, a pivoted three-armed lever carrying a toothed arc meshing with the pinion, and having an arm extending in the path of a stud on a movable frame to rock the lever and restore the hand, substantially as described.

Milford, Connecticut, June 28, 1893.

JOSEPH G. NOYES.
LOUIS WINTERHALDER.

Witnesses:
A. H. GARDNER,
W. CECIL DURAND.

It is hereby certified that in Letters Patent No. 514,128, granted February 6, 1894, upon the application of Joseph G. Noyes and Louis Winterhalder, of Milford, Connecticut, for an improvement in "Signaling Systems," errors appear in the printed specification requiring correction, as follows: In line 114, page 4, the word "wheel" should be stricken out and the words *signaling mechanism* inserted instead; and in lines 115 and 118, same page, the word "mechanism" should be *mechanisms*; and that the said Letters Patent should be read with these corrections therein that the same may conform to the record of the case in the Patent Office.

Signed, countersigned, and sealed this 27th day of February, A. D. 1894.

[SEAL.]

JNO. M. REYNOLDS,
*Assistant Secretary of the Interior.*

Countersigned:

JOHN S. SEYMOUR,
*Commissioner of Patents.*